United States Patent
Cohen et al.

(10) Patent No.: US 8,239,405 B1
(45) Date of Patent: Aug. 7, 2012

(54) KEYWORDS FILTERING BASED ON COMBINED SCORES

(75) Inventors: Brandon Cohen, Tenafly, NJ (US); Seth Dotterer, Mohegan Lake, NY (US); Vishal Berry, New York, NY (US); Paul Koelkebeck, Jersey City, NJ (US); Seth Besmertnik, New York, NY (US)

(73) Assignee: Conductor, Inc., New York, NY (US)

( * ) Notice: Subject to any disclaimer, the term of this patent is extended or adjusted under 35 U.S.C. 154(b) by 73 days.

(21) Appl. No.: 12/956,410

(22) Filed: Nov. 30, 2010

(51) Int. Cl.
*G06F 7/00* (2006.01)
*G06F 17/30* (2006.01)
(52) U.S. Cl. .................................... 707/769
(58) Field of Classification Search ............... None
See application file for complete search history.

(56) References Cited

U.S. PATENT DOCUMENTS

| | | | |
|---|---|---|---|
| 2007/0027852 A1* | 2/2007 | Howard et al. ............. | 707/3 |
| 2007/0156757 A1* | 7/2007 | Tang et al. ............. | 707/104.1 |
| 2008/0201324 A1* | 8/2008 | Aronowich et al. ........... | 707/5 |
| 2008/0319746 A1* | 12/2008 | Okamoto et al. ........... | 704/245 |

OTHER PUBLICATIONS

An et al, "Finding short patterns to classify text documents", IEEE 2006, 4 pages.*
Phan et al, "Learning to classify short and sparse text & web with hidden topics from large-scale data collections", WWW 2008, Apr. 21-25, 2008, Beijing, China, 10 pages.*

* cited by examiner

*Primary Examiner* — Uyen T. Le
(74) *Attorney, Agent, or Firm* — Moritt Hock & Hamroff LLP; Steven S. Rubin, Esq.

(57) ABSTRACT

A system and method for filtering keywords. The method may include receiving a first set of keywords. The method may include determining a first set of numbers associated with a first metric relating to the first set of keywords and a second set of numbers associated with a second metric relating to the first set of keywords. The method may include receiving at least one metric rule relating to the first and the second metric. The method may include determining a respective combination number for each keyword in the first set of keywords based on the first set of numbers, the second set of numbers, and the metric rule. The method may include filtering the first set of keywords based on the respective combination numbers to produce a second set of keywords.

20 Claims, 3 Drawing Sheets

KEYWORDS FILTERING BASED ON COMBINED SCORES

BACKGROUND OF THE INVENTION

1. Field of the Invention

This disclosure relates to a system and method for filtering a set of keywords.

2. Description of the Related Art

Referring to FIG. 1, the World Wide Web ("WWW") is a distributed database including literally trillions of pages accessible through the Internet. Searching and indexing these pages to produce useful results in response to user queries is constantly a challenge. A search engine is typically used to search the WWW.

A typical prior art search engine 20 is shown in FIG. 1. Pages from the Internet or other source 22 are accessed through the use of a crawler 24. Crawler 24 aggregates pages from source 22 to ensure that these pages are searchable. Many algorithms exist for crawlers and in most cases these crawlers follow links in known hypertext documents to obtain other documents. The pages retrieved by crawler 24 are stored in a database 36. Thereafter, these pages are indexed by an indexer 26. Indexer 26 builds a searchable index of the pages in a database 34. For example, each web page may be broken down into words and respective locations of each word on the page. The pages are then indexed by the words and their respective locations.

In use, a user 32 uses a processor 38 to send a search query to a dispatcher 30. Dispatcher 30 compiles a list of search nodes in cluster 28 to execute the query and forwards the query to those selected search nodes. The search nodes in search node cluster 28 search respective parts of the index 34 and return search results along with a document identifier to dispatcher 30. Dispatcher 30 merges the received results to produce a final result set displayed to user 32 sorted by ranking scores based on a ranking function. This disclosure describes an improvement over these prior art technologies.

SUMMARY OF THE INVENTION

One embodiment of the invention is a method for filtering keywords. The method may include receiving, by a processor, a first set of keywords and determining, by the processor, a first set of numbers associated with a first metric relating to the first set of keywords. The method may include determining, by the processor, a second set of numbers associated with a second metric relating to the first set of keywords and receiving, by the processor, at least one metric rule relating to the first and the second metric. The method may include determining, by the processor, a respective combination number for each keyword in the first set of keywords based on the first set of numbers, the second set of numbers, and the metric rule; and filtering, by the processor, the first set of keywords based on the respective combination numbers to produce a second set of keywords.

Another embodiment of the invention is a system for filtering keywords. The system may include a memory and a processor in communication with the memory. The processor may be effective to receive a first set of keywords and determine a first set of numbers associated with a first metric relating to the first set of keywords. The processor may be effective to determine a second set of numbers associated with a second metric relating to the first set of keywords; and receive at least one metric rule relating to the first and the second metric. The processor may be effective to determine a respective combination number for each keyword in the first set of keywords based on the first set of numbers, the second set of numbers, and the metric rule; and filter the first set of keywords based on the respective combination numbers to produce a second set of keywords.

Another embodiment of the invention is a method for filtering keywords. The method may include sending, by a first processor, a first set of keywords over a network and receiving, by a second processor, the first set of keywords. The method may include determining, by the second processor, a first set of numbers associated with a first metric relating to the first set of keywords; and determining, by the second processor, a second set of numbers associated with a second metric relating to the first set of keywords. The method may include sending the first and second set of numbers and the first set of keywords from the second processor to the first processor; and sending, from the first processor to the second processor, at least one metric rule including respective weights assigned to the first and the second metric. The method may include receiving, by the second processor, the at least one metric rule; and determining, by the second processor, a respective combination number for each keyword in the first set of keywords based on the first set of numbers, the second set of numbers, and the metric rule. The method may include sending, from the first processor to the second processor, a filter request, wherein the filter request relates to filtering the first set of keywords based on the numbers associated with the metrics; and filtering, by the second processor, the first set of keywords based on the respective combination numbers and the filter request to produce a second set of keywords. The method may include sending the second set of keywords from the second processor to the first processor.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

DETAILED DESCRIPTION OF THE PREFERRED EMBODIMENT(S)

Figure 1:
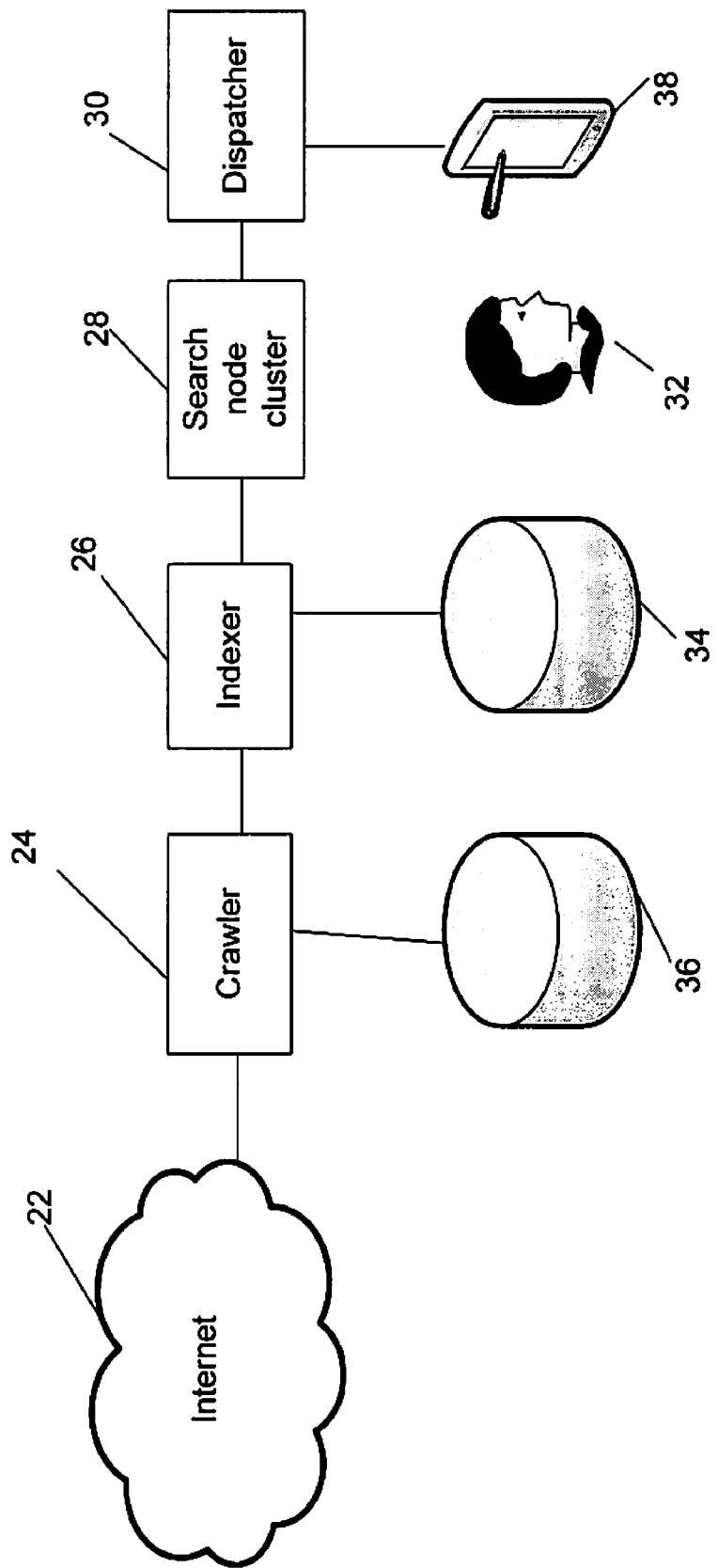
FIG. 1 is a system drawing of a search engine in accordance with the prior art.

In the following detailed description, reference is made to the accompanying drawings which form a part thereof. In the drawings, similar symbols typically identify similar components unless context indicates otherwise. The illustrative embodiments described in the detailed description, drawings and claims are not meant to be limiting. Other embodiments may be utilized and other changes may be made without departing from the spirit or scope of the subject matter presented herein. It will be readily understood that the aspects of the present disclosure as generally described herein and as illustrated in the accompanying figures can be arranged, substituted, combined, separated and/or designed in a wide variety of different configurations all of which are explicitly contemplated herein.

Figure 2:
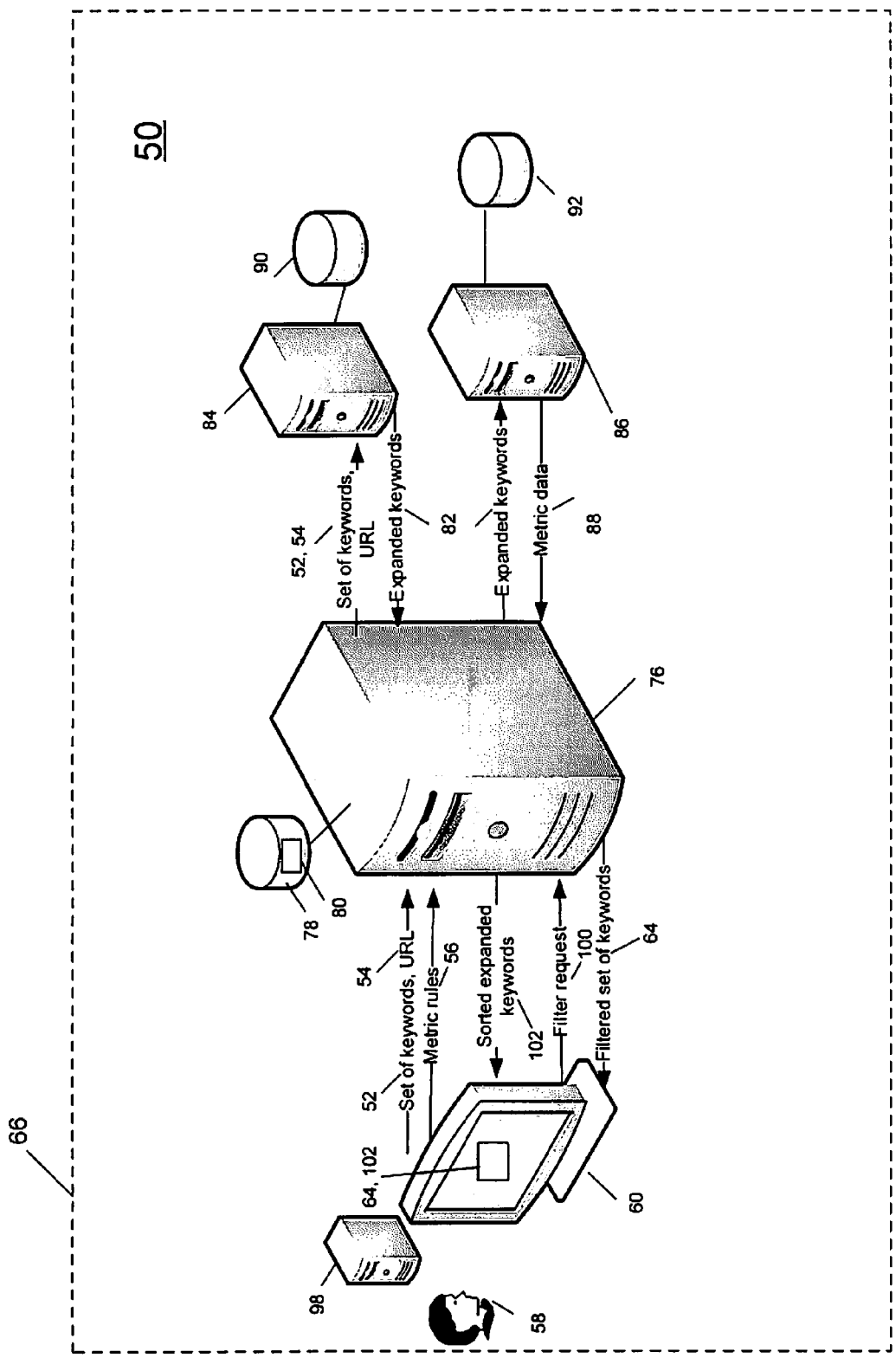
FIG. 2 is a system drawing of a system in accordance with an embodiment of the invention.

Referring to FIG. 2, there is shown a system 50 in accordance with an embodiment of the invention. As shown, a user 58 may use a processor 98 to send a set of keywords 52, and/or a URL (uniform resource locator) 54 to a processor 76. Each keyword 52 could be, for example, one or more characters, symbols, operators, and/or words. User 58 may also send metric rules 56 to processor 76 as is explained in more detail below. Processor 76 receives set of keywords 52 and/or URL 54 and generates a filtered set of keywords 64. Filtered set of keywords 64 may include keywords that user 58 may wish to track for his business. Filtered set of keywords 64 may be displayed to user 58 on a display 60. Processor 76 may be in communication with user 58 and display 60 over a network 66 such as the Internet network. Processor 76 may further be in communication with a memory 78 including instructions 80.

Set of keywords 52 could include, for example, keywords relevant to a business and/or web site owned by user 58. URL 54 may include a URL relating to a web site owned by user 58 and/or a URL relating to a web site owned by a competitor of user 58. For example, processor 76 may scrape a web site located at an address corresponding to URL 54 to generate expanded set of keywords 82. For example, the scraping could include looking at tags, content, keyword density, etc.

Processor 76 may receive set of keywords 52 and/or URL 54 and determine an expanded set of keywords 82. Processor 76 may also send set of keywords 52 and/or URL 54 over network 66 to another processor 84 in communication with a database 90 to determine expanded set of keywords 82. Processor 84 may be, for example, a processor associated with GOGGLE ADWORDS, COREMETRICS, OMNITURE, or another service effective to receive set of keywords 52 and generate additional keywords for expanded set of keywords 82. For example, processor 84 may look at query logs, perform query term expansion to include modifiers, perform synonym expansion, content extraction, etc. Similarly, processor 84 could be a processor associated with a service like SPYFU or another related service effective to receive URL 54 and generate additional keywords for expanded set of keywords 82. Expanded set of keywords 82 may be a combination of set of keywords 52 and additional keywords generated by processor 76 and/or processor 84.

Processor 76 may send a query with expanded set of keywords 82 to one or more additional processors 86 in communication with a database 92. The one or more additional processor(s) 86 may be able to determine metric data 88 relating to expanded set of keywords 82. For example, processor 86 may be controlled by user 58 in situations where user 58 provides metric data 88. User 58 may, for example, be able to provide data relating to a metric "volume" for keywords in expanded set of keywords 82.

For example, metric data 88 may include numbers associated with metrics relating to set of keywords 52. For example, the metrics may include "volume" (such as a monthly search volume for a keyword), "value" (such as a value attributed to the keyword by GOOGLE ADWORDS or based on other analytics metrics), or "rank" (such as a rank of URL 54 in a result set for each keyword in expanded set of keywords 82 across one or more search engines). The metrics in metric data 88 could include "popularity", such as the popularity of a keyword in social media like FACEBOOK or TWITTER. For example, the metrics could include hot trends in TWITTER indicative of an aggregate volume of a trend in TWITTER, trend analysis on a tweet stream, a lexicon in FACEBOOK relating to terms on wall posts, etc. In an example, additional processor 86 could include a GOOGLE application programming interface (API) relating to monthly search volume. In the example, metric data 88 determined by processor 76 may include the monthly search volume for each keyword in expanded set of keywords 82.

Expanded set of keywords 82 may be sorted by processor 76 based on metrics relating to expanded set of keywords 82 to produce sorted expanded set of keywords 102. Sorted expanded set of keywords 82 may also be sent to display 60 over network 66 and may include metric data 88. For example, sorted expanded set of keywords 102 may be displayed on display 60 in columns corresponding to metric data 88 such as in an EXCEL spreadsheet as shown in the example below. In each column, keywords may be sorted based on the particular metric—such as sorted by numbers associated with the metrics "value", "rank", "volume", etc. In this way, user 58 can easily see a keyword or keywords in sorted expanded set of keywords 82 that has the highest number associated with any particular metric. For example, user 58 can easily see which keyword has the highest number associated with the metric "value" or "volume". In the example below, keyword "Abc" had the highest number associated with the metric "value" and with the metric "rank".

| value | rank | volume | . . . |
|-------|------|--------|-------|
| Abc   | Abc  | Xyz    |       |
| Xyz   | Jfk  | Abc    |       |
| Jfk   | Xyz  | Jfk    |       |
| . . . | . . .| . . .  |       |

User 58 may use processor 98 to send metric rules 56 to processor 76. Processor 76 may use metric rules 56 to generate a combination number associated with a combined metric for each keyword in expanded set keywords 82 based on metric data 88. Similarly, processor 76 may generate and assign metric rules 56 for particular types of users as is explained in more detail below.

User 58 may use metric rules 56 to generate a user defined combination metric including metrics important to user 58. For example, user 58 may use metric rules 56 to filter sorted expanded set of keywords 82 based on metrics important to user 58. User 58 may assign a weight or percentage value to at least some of the metrics whose data is included in metric data 88. For example, user 58 may indicate in metric rules 56 that the metric "value" should be assigned a 50% weight, the metric "volume" should be assigned a 25% weight and the metric "rank" should be assigned a 25% weight. User 58 may provide this information through a user interface such as a slider where user 58 can slide among discrete values from 0% to 100% reflecting weights of 0% to 100%.

Processor 76 may assign scores for keywords based on the numbers associated with the respective metrics in metric data 88. In an example of sorted expanded keywords 102, 3 keywords ("Abc", "Xyz", "Jfk", etc.), along with metrics "value", "rank", "volume", and a user defined combination metric, are shown below. In the example, keyword "Abe" has the highest number associated with the metric "value" and so processor 76 may assign keyword "Abc" the highest score for metric "value"—in this example a score of 10 is the highest score assigned. Keyword "Xyz" has the second highest number associated with the metric "value", and so keyword "Xyz" is assigned a score of 9 for the metric "value". Similarly, keyword "Xyz" has the highest number associated with the metric "volume", and so keyword "Xyz" is assigned the highest score for the metric "volume". In an example, each keyword may each be assigned a distinct score. In another example, groups of keywords may be assigned the same score. For example, the 3 keywords with the highest number associated with a metric may all receive a score of 10, the 3 keywords with the next highest numbers associated with a metric may all receive a score of 9, etc.

| score | value | rank | volume | user defined combination metric | ... |
|---|---|---|---|---|---|
| 10 | Abc | Abc | Xyz | | |
| 9 | Xyz | Jfk | Abc | | |
| ... | Jfk | Xyz | Jfk | | |

Metric rules 56 allow user 58 and/or processor 76 to define weights to be applied to the scores to produce a user defined combination metric relating to the keywords. In the example referenced above, user 58 may select weights indicating 50% for the "value" metric, 25% for the "rank" metric and 25% for the "volume" metric in metric rules 56. In the example, the user defined combination metric for each keyword would be the result of weighing the score for the "value" metric by 50% plus weighing the score for the "rank" metric by 25% plus weighing the score of the "volume" metric by 25%. In the example, the number associated with the user defined combination metric for the keyword "Abc" may be 0.5(10)+(0.25)(10)+0.25(9). The user defined combination metric in sorted expanded keywords 102 may sort all of the keywords in expanded set of keywords 82 based on numbers associated with the user defined combination metric. Sorted expanded set of keywords 102 allows user 58 to easily see which keywords have the highest number associated with weighted metrics defined by user 58 and/or processor 76. After user 58 or processor 76 defines metric rules 56, when the data underlying each of the metrics changes (e.g. a rank for a keyword changes), metric data 88 and the user defined combination metric for each keyword may similarly change. Sorted expanded set of keywords 102 may be updated accordingly.

In some examples, if user 58 wishes to select a metric rule for a metric for which system 50 has not received data, processor 76 may make the applicable user interface for that metric unavailable. For example, if user 58 wishes to select a weight for the metric "volume" and no metric data 88 is available for "volume", processor 76 may make unavailable or "gray-out" a slider relating to "volume". Alternatively, if user 58 wishes to select a metric rule for a metric for which system 50 has not received data, processor 76 may assign an arbitrary score, such as a lowest score, for the metric for the related keyword.

Metric rules 56 may include a set of demographics of customers for user 58. For example, user 58 may desire to know keywords that are important to his particular customers. In these examples, processor 84 may include a service like COMSCORE where keywords relating to the demographics in metric rules 56 may be generated and added to set of keywords 52 to produce expanded set of keywords 82. Additionally, processor 86 may provide a weight for expanded set keywords 82 relating to input demographics. For example, certain keywords that are more relevant to a target demographic may receive a higher weight. In an example, the term "auto" may receive a higher weight than the term "automobile" for a demographic of males between 35 and 50 years old.

Processor 76 may define preset weights for metric rules 56. For example, processor 76 may define a "retailer" composite metric and associated weights or percentages for each metric relating to a "retailer". For example, a "retailer" composite metric may include a 50% weight for the metric "value", a 25% weight for the rank metric, etc. User 58 can similarly define certain custom preset composite metrics with associated weights. For example, user 58 may define a "Preset 1" with a set of defined weights for metrics and a "Preset 2" with a distinct set of defined weights for the metrics.

User 58 may request that processor 76 filter sorted expanded set of keywords 102 based on a filter request 100. For example, filter request 100 may indicate that user 58 would like to see keywords in sorted expanded set of keywords where the metric "value" is above a defined number or where the user defined combination metric is above a defined number. In response to filter request 100, processor 76 generates and sends narrowed set of keywords 64 to display 60. Filter request 100 may be processed by processor 76 at desired intervals so that filtered set of keywords 64 may be periodically updated.

User 58 can thus easily monitor metrics relating to keywords and switch among distinct marketing strategies and campaigns in response to numbers associated with the metrics. Metric rules 56 allow user 58 to define a combination metric reflecting weights of metrics that are important to the user. In this way, user 58 may receive filtered set of keywords 64 effectively identifying keywords that may be more important to user 58 than other keywords in set of keywords 52. Filtered set of keywords 64 may be updated at desired intervals by processor 76 as metric data 88 changes.

Among other benefits, using a system in accordance with this disclosure a user can more easily identify which keywords should receive marketing research focus. The user can create a customized scoring model to filter a set of keywords. Prior art techniques tend to be more suited to generating increasing numbers of keywords to monitor. Such voluminous keywords (frequently totaling over 10,000 in number) are very difficult to monitor and manage.

Figure 3:
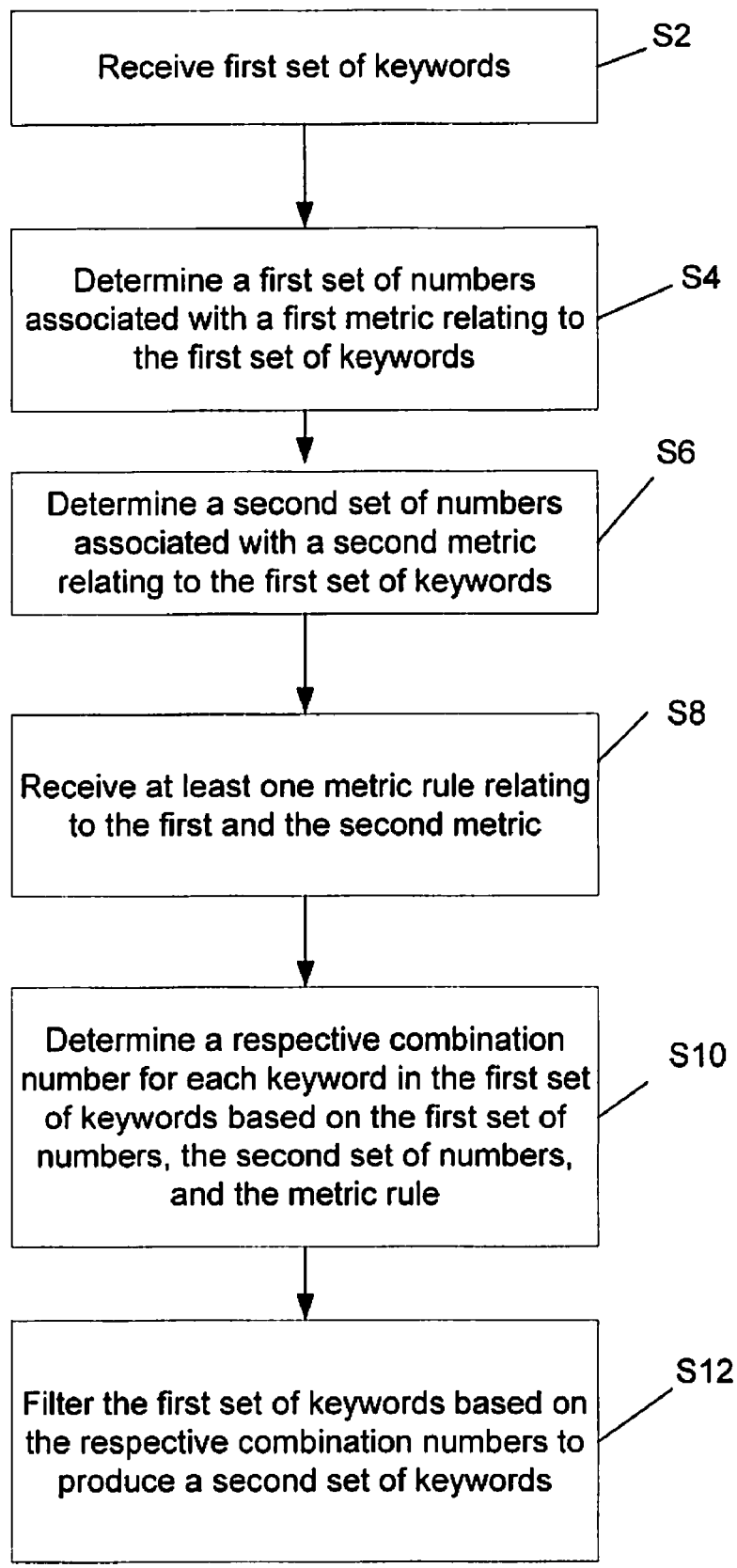
FIG. 3 is a flow diagram illustrating a process which could be performed in accordance with an embodiment of the invention.

Referring to FIG. 3, there is shown a process which could be performed in accordance with an embodiment of the invention. The process could be performed using, for example, system 50 discussed above.

As show, at step S2, a processor may receive a first set of keywords. The first set of keywords could be a list of keywords of interest to a user and may include a URL. At step S4, the processor may determine a first set of numbers associated with a first metric relating to the first set of keywords. For example, the processor may determine numbers associated with metrics for each of the keywords in the first set of keywords. Similarly, at step S6, the processor may determine a second set of numbers associated with a second metric relating to the first set of keywords.

At step S8, the processor may receive at least one metric rule relating to the first and the second metric. For example, the metric rule may be a set of weights assigned by a user for each of the metrics indicating which of the metrics are more of interest to the user. At step S10, the processor may determine a respective combination number for each keyword in the first set of keywords based on the first set of numbers, the second set of numbers, and the metric rule. For example, the processor may determine a combination number for each keywords based on the numbers associated with the metrics and the weights assigned by the user. At step S12, the processor may filter the first set of keywords based on the respective combination numbers to produce a second set of keywords.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for filtering keywords, the method comprising:
   receiving, by a processor, a first set of keywords;
   determining, by the processor, a first set of numbers associated with a first metric relating to the first set of keywords;
   determining, by the processor, a second set of numbers associated with a second metric relating to the first set of keywords;
   receiving, by the processor, at least one metric rule relating to the first and the second metric;
   determining, by the processor, a respective combination number for each keyword in the first set of keywords based on the first set of numbers, the second set of numbers, and the metric rule; and
   filtering, by the processor, the first set of keywords based on the respective combination numbers to produce a second set of keywords.

2. The method as recited in claim 1, further comprising sending the second set of keywords to a display.

3. The method as recited in claim 1, further comprising:
   sending the first set of keywords and the first and second set of numbers to the display.

4. The method as recited in claim 1, wherein receiving the first set of keywords includes:
   receiving a third set of keywords;
   sending the third set of keywords to another processor effective to generate additional keywords based on the third set of keywords, wherein the first set of keywords includes a combination of the third set of keywords and the additional keywords.

5. The method as recited in claim 1, wherein the metric rule includes weights assigned to the first and the second metric.

6. The method as recited in claim 1, wherein the metric rule relates to a demographic and the method further comprises:
   receiving a third set of keywords;
   sending the demographic to another processor effective to generate additional keywords based on the demographics, wherein the first set of keywords includes a combination of the third set of keywords and the additional keywords.

7. The method as recited in claim 1, wherein receiving the first set of keywords includes:
   receiving, by the processor, a URL;
   determining, by the processor, the first set of keywords based on a page corresponding to the URL.

8. The method as recited in claim 7, wherein determining the first set of keywords based on a page corresponding to the URL includes scraping the page.

9. The method as recited in claim 7, wherein determining the first set of keywords based on a page corresponding to the URL includes sending the page to another processor effective to determine the first set of keywords based on the page.

10. The method as recited in claim 1, further comprising:
    receiving, by the processor, a filter request, wherein the filter request relates to filtering the first set of keywords based on the numbers associated with the metrics; and
    wherein the filtering the first set of keywords includes filtering based on the filter request.

11. The method as recited in claim 1, wherein the metric rule is received from a user.

12. The method as recited in claim 1, wherein the metric rule is determined by the processor based on a user.

13. The method as recited in claim 1, further comprising:
    assigning, by the processor, a first set of scores for the first set of keywords based on the first set of numbers;
    assigning, by the processor, a second set of scores for the first set of keywords based on the second set of numbers; and
    wherein determining the respective combination number is based on the first and second set of scores.

14. The method as recited in claim 13, wherein:
    the metric rules relate to weights for the first and second sets of scores.

15. The method as recited in claim 13, wherein each keyword is assigned a distinct score for each metric.

16. The method as recited in claim 13, wherein two or more keywords are assigned the same score for at least one of the metrics.

17. A system for filtering keywords, the system comprising:
    a memory;
    a processor in communication with the memory, wherein the processor is effective to:
    receive a first set of keywords;
    determine a first set of numbers associated with a first metric relating to the first set of keywords;
    determine a second set of numbers associated with a second metric relating to the first set of keywords;
    receive at least one metric rule relating to the first and the second metric;
    determine a respective combination number for each keyword in the first set of keywords based on the first set of numbers, the second set of numbers, and the metric rule; and
    filter the first set of keywords based on the respective combination numbers to produce a second set of keywords.

18. The system as recited in claim 17, further comprising;
    a display in communication with the processor;
    wherein the display is effective to display the second set of keywords.

19. The system as recited in claim 17, wherein the processor is further effective to:
    receive a filter request, wherein the filter request relates to filtering the keywords based on the numbers associated with the metrics; and
    filter the first set of keywords based on the filter request.

20. A method for filtering keywords, the method comprising:
    sending, by a first processor, a first set of keywords over a network;
    receiving, by a second processor, the first set of keywords;
    determining, by the second processor, a first set of numbers associated with a first metric relating to the first set of keywords;
    determining, by the second processor, a second set of numbers associated with a second metric relating to the first set of keywords;
    sending the first and second set of numbers and the first set of keywords from the second processor to the first processor;
    sending, from the first processor to the second processor, at least one metric rule including respective weights assigned to the first and the second metric;
    receiving, by the second processor, the at least one metric rule;
    determining, by the second processor, a respective combination number for each keyword in the first set of key words based on the first set of numbers, the second set of numbers, and the metric rule;

sending, from the first processor to the second processor, a filter request, wherein the filter request relates to filtering the first set of keywords based on the numbers associated with the metrics;

filtering, by the second processor, the first set of keywords based on the respective combination numbers and the filter request to produce a second set of keywords; and sending the second set of keywords from the second processor to the first processor.

\* \* \* \* \*